3,447,899
METHOD OF PURIFYING MAGNESIUM VALUES
John Maskal and Ivan M. Thompson, Ludington, and George W. Waldron, Bay City, Mich., assignors to The Dow Chemical Company, Midland, Mich.
No Drawing. Filed Feb. 28, 1966, Ser. No. 530,377
Int. Cl. C01f 5/06, 5/24
U.S. Cl. 23—67                                         4 Claims

ABSTRACT OF THE DISCLOSURE

A method of treating magnesium hydroxide slurries to produce magnesium oxide having a low boron and chloride impurity level which comprises: carbonating a boron impurity containing magnesium hydroxide slurry, thereby precipitating magnesium carbonate hydrate; separating and washing the precipitate; and calcining the precipitate to form high purity magnesium oxide.

---

This invention relates to the treatment of magnesium hydroxide and to a novel method of providing a low impurity magnesium carbonate product from impure $Mg(OH)_2$, said method and product having particular utility in a method of providing a calcinable high purity feed to a periclase kiln.

Magnesium hydroxide ($Mg(OH)_2$) that is, for example, to be calcined to refractory grade magnesium oxide (MgO), may contain an appreciable quantity of boron impurity (calculated as $B_2O_3$), depending on the source of brine and lime or alkali materials from and by which the original magnesium values were obtained. This may detrimentally affect the life and strength characteristics of the refractory. Predominantly, the boron impurity in the $Mg(OH)_2$ arises from the brine but may also arise to some extent from the lime which in aqueous suspension is used as a precipitant to precipitate magnesium values from the brine.

The prior art methods of removing boron and chloride values from $Mg(OH)_2$ have been at least in part unsuccessful inasmuch as they either have been commercially unfeasible or uneconomical in the practical application, or, in some cases, even served to introduce other contaminants into the $Mg(OH)_2$ while purging it of the boron values.

One prior art method concerns precipitation of $Mg(OH)_2$ from brine while maintaining a substantial excess of hydroxyl ions. Though this method is simple and economical it suffers from the disadvantage that the boron impurity reduction is only about 60 percent complete. Moreover, there is a significant increase of an undesirable calcium value impurity in the precipitated $Mg(OH)_2$. It is to be understood that this disadvantage is essentially confined to precipitation of magnesium values with lime slurry and/or from calcium containing brines.

A primary object of the present invention is to provide a new and novel method of treating magnesium hydroxide to remove impurities therefrom.

A further object of the invention is to provide a new and novel method of treating magnesium hydroxide slurries to provide a calcinable magnesium carbonate product low in, for example, boron, chloride and sulfate impurities.

Another object of the present invention is to provide a novel method of treating magnesium hydroxide slurries which is simple, rapid and economical.

Another object of the invention in a method of making periclase is to provide an improvement wherein a high purity low boron-containing calcinable magnesium carbonate is prepared as a feed for introduction into a periclase kiln.

Other objects and advantages will become apparent from the following detailed description of the invention.

The above and other objects and advantages are obtained in accordance with the present invention by the novel method comprising in general: (1) providing an aqueous magnesium hydroxide slurry contaminated, for example, with boron and chloride impurities desired to be removed, (2) carbonating said slurry by passing carbon dioxide therethrough, thereby to form insoluble magnesium carbonate hydrates, for example, the tri- and/or pentahydrates in a liquid phase, (3) separating the resulting solid magnesium carbonate hydrates from the liquid phase, (4) washing the carbonate crystals so-separated to purify same by removing soluble and/or occluded boron and other impurities therefrom and as an optional additional step, (5) calcining said purified magnesium carbonate in one or more stages to a magnesium oxide product characterized by a low boron and/or chloride content, or to refractory grade magnesium oxide as periclase.

By this heretofore unknown method of removing boron impurities from $Mg(OH)_2$ it is now possible to obtain a purified, high quality, essentially boron free feed product for introduction into a periclase kiln, a low boron magnesium oxide, and a low boron periclase product, which is simple, economical and commercially feasible.

Most, if not all, of the calcinable magnesium hydroxide slurries prepared by any conventional or nonconventional prior art means are susceptible of being treated and purified by the present novel method regardless of the initial source of the magnesium values. The solids concentration of said slurries is not critical and may be varied accordingly.

The term "magnesium carbonate" as used herein means the hydrated form thereof, usually the penta and/or the trihydrate thereof.

In the carbonation of the magnesium hydroxide, whereby the boron and other impurities are eliminated, the temperature of the slurry should operably be from about 10 to about 40° C. and preferably from about 25 to about 35° C. A particularly convenient slurry temperature at which to carry out carbonation has been found to be about 30° C. While operable, a temperature of from about 10 to 15° C. is somewhat lower than desired, as in this range the less desirable pentahydrate of magnesium carbonate tends to form. On the other hand a carbonation temperature exceeding about 40° C. tends to form basic magnesium carbonate ($3MgCO_3 \cdot Mg(OH)_2 \cdot 3H_2O$), the particles of which are substantially too fine to be readily dewatered to a high solids content or efficiently washed. At temperatures within the preferred or optimum range, however, the trihydrate of magnesium carbonate is desirably obtained in relatively large crystals. By virtue of its large crystal size this product may be recovered by filtration and readily washed. Carbonation is normally continued until all or essentially all of the magnesium hydroxide is converted to some hydrated form of the carbonate. Progress of carbonation in the reactor may be determined by periodically sampling and testing the reaction mass as will be described hereinafter.

To effect carbonation, carbon dioxide gas is passed through the slurry within the indicated temperature range by, e.g., a sparging tube or a mechanical carbonator such as, for example, a commercially available gas turbo carbonator. The concentration of $CO_2$ in the gas passed through the slurry is only important as to the rate of conversion to the carbonate desired. The rate of flow of $CO_2$ through slurry will to some extent inversely relate to the concentration of $CO_2$. For example, if pure $CO_2$ is passed through the rate of flow may be slower than, e.g., if the $CO_2$ concentration were lower.

Upon completion of carbonation, the carbonated slurry is separated from the liquid phase of the reaction mass by e.g., filtration either with or without a vacuum, then washed with a suitable washing fluid such as water, at, e.g., ambient temperatures, or some other suitable temperature. The magnesium carbonate precipitate, especially the trihydrate thereof, is characteristically in the form of large needles about 5 by 70 microns, thus enabling effective separation from the remainder of the slurry, by known particle size separation means such as for example, by using a 325 mesh (U.S. Standard Sieve) screen to retain the carbonate crystals.

Subsequent to washing, the hydrated magnesium carbonate is readily converted as by calcining, in one or more heat treating stages, to MgO by driving off the $CO_2$ and water therefrom to provide a MgO product low in boron, chloride, and to some extent sulfate ($SO_4$) impurities. This high purity magnesium oxide may be used depending on the degree and type of calcination, as a refractory material (periclase) or in any application requiring MgO containing a low chloride and/or boron impurity level.

As aforesaid, the high purity magnesium carbonate may be converted by calcination to MgO having the desired degree of reactivity, i.e., to a so-called light burned stage (reactive) or to a dead burned stage (essentially unreactive), for example, to the periclase stage.

By way of illustration, a one stage calcination of, for example, magnesium carbonate ($MgCO_3 \cdot 3H_2O$) is carried out by preferably adding same as a slurry or operatively as a dewatered filter cake to a rotary kiln. As the magnesium carbonate passes through the kiln it is dried, decomposed to magnesium oxide (MgO) and carbon dioxide, and finally as the temperature in the kiln reaches about, for example, 1600° C.–1700° C. or higher, grain growth occurs to provide a "dead burned" periclase product from which refractory bricks and the like can be made. The carbon dioxide from the decomposed magnesium carbonate can be recycled back to an earlier step in the present process and used in carbonating additional magnesium hydroxide slurry.

In a two stage calcination the magnesium carbonate, for example, $MgCO_3 \cdot 3H_2O$, would as a first stage be dried and calcined at a temperature of from about 700° to 1000° C. The resulting light burned magnesium oxide (low in boron) would then, for example, be briquetted at 15,000 p.s.i.g., to give compact briquettes ranging in size from about one-half inch to one or one and one-half inches in diameter. The briquettes are then introduced as a second stage into, for example, a shaft kiln and exposed to a temperature of about 2000° C. or more. Normally this two-stage calcining method using a shaft kiln for the second stage gives the highest periclase density approaching, for example, about 3.45 grams per cubic centimeter. Here too the carbon dioxide by-product from calcination can be recycled for use in carbonating the magnesium hydroxide slurry.

The present novel process provides a new and unique method of providing a high purity material which can be calcined to magnesium oxide or periclase products especially low in boron and chloride impurities.

The following examples serve to further illustrate the novelty and utility of the present invention but are not to be construed as limiting the invention thereto.

Example I

A magnesium hydroxide slurry having the following impurity assay, diluted with water to an 8 percent $Mg(OH)_2$ consistency, was carbonated with 20 percent by volume $CO_2$-in-air gas mixture:

Percent—
    CaO _____ 0.56
    Acid insoluble _____ 0.65
    $Fe_2O_3$ _____ 0.18
    $Al_2O_3$ _____ 0.19
    Cl _____ 0.40
    P.p.m./$B_2O_3$ _____ 1104
    MgO _____ Balance (impurities calculated on 100 percent dry weight basis of MgO).

A laboratory scale gas turbo carbonator was used at an equivalent gas rate of 1 c.f.m. per ft.³ of slurry. The slurry was maintained at about a constant 30° C. temperature. The progress of carbonation was followed by periodically removing 15–20 ml. samples, filtering, and then titrating 10 ml. of the filtrate with 0.1 N HCl to a methyl orange end point. The desired state of completion of the carbonation reaction can be ascertained by a sharp increase in the soluble alkalinity, indicating the conversion of hydrated $MgCO_3$ to the more soluble $Mg(HCO_3)_2$. The soluble alkalinity as used herein is defined as the number of mls. of 0.1 N HCl necessary to neutralize 10 mls. of carbonator slurry filtrate to the methyl orange end point. The slurry so-carbonated was then sieved through a 325 mesh screen thereby permitting recovery of the relatively large crystallized $MgCO_3 \cdot 3H_2O$ particles (primarily) and providing a significant separation of the boron and soluble chloride impurities. Water rinsing of the carbonate crystals provided a further reduction in the impurity levels to practically zero. The impurity levels through the above sequence are as follows:

| Impurity level calculated on a 100% MgO basis | Starting material ($Mg(OH)_2$) | Unwashed $MgCO_3 \cdot 3H_2O$ | Washed $MgCO_3 \cdot 3H_2O$ |
|---|---|---|---|
| Percent Cl | 0.4 | 0.19 | 0.02 |
| P.p.m./$B_2O_3$ | 1,104 | 283 | Nil |

This high purity $MgCO_3 \cdot 3H_2O$ material can be calcined to obtain boron free, high quality grade MgO product, such as, for example, periclase.

From the above example it can be clearly seen that the aforesaid chloride impurities can be substantially reduced and almost eliminated, while boron impurities can be essentially eliminated by the inventive method of the present invention.

Example II

A magnesium hydroxide slurry containing 2170 p.p.m./ $B_2O_3$ and 0.45 percent Cl (calculated on a 100 percent MgO basis) was diluted with water to an 8 percent $Mg(OH)_2$ concentration and carbonated with a 20 to 22 percent by volume $CO_2$-in-air mixture with a laboratory scale gas turbo carbonator at an equivalent gas rate of 1 c.f.m. per ft.³ of slurry. The first of three carbonations was carried out at 10° C. to yield the $MgCO_3 \cdot 5H_2O$ product, the second at 30° C. to yield the $MgCO_3 \cdot 3H_2O$ product, and the third, as a control sample for comparison purposes, at 60° C. to yield the basic magnesium carbonate product $(3MgCO_3 \cdot Mg(OH)_2 \cdot 3H_2O)$ Two liters of slurry from each run were collected and filtered with a Büchner funnel to form in each case a damp filter cake. One half of each filter cake was washed by reslurrying with 250 ml. of distilled water and then refiltering. This washing sequence was repeated one more time. The washed and unwashed filter cakes from each carbonation batch were analyzed for p.p.m./$B_2O_3$ and percent Cl. The results are summarized in the following table:

TABLE

| Impurity level or 100% MgO basis | $Mg(OH)_2$ slurry | $MgCO_3 \cdot 5H_2O$ | | $MgCO_3 \cdot 3H_2O$ | | (Control) Basic magnesium carbonate | |
|---|---|---|---|---|---|---|---|
| | | Unwashed | Washed | Unwashed | Washed | Unwashed | Washed |
| P.p.m./$B_2O_3$ | 2,170 | 634 | 438 | 452 | 298 | 1,208 | 853 |
| Percent Cl | 0.45 | 0.06 | 0.03 | 0.09 | 0.04 | 0.42 | 0.18 |

The $MgCO_3 \cdot 3H_2O$ contained the lowest boron impurity content of the three products. The chloride content of both the $MgCO_3 \cdot 3H_2O$ and $MgCO_3 \cdot 5H_2O$ products was at a low level as can be seen from the table.

Calcination of the tri and penta magnesium carbonate hydrate materials would yield an essentially boron free, low chloride impurity magnesium oxide product.

Example III

A high purity, low boron, magnesium carbonate trihydrate product was prepared similarly as in Example I.

One sample (air dried to a powder) was given a Standard Laboratory Periclase Firing Test comprising in general, loading a 1.25 inch diameter die with said powder sample, compressing the sample at 7500 to 15,000 p.s.i. pressure into a pellet, and heating the pellet at about 1700° C. in a programmed gas furnace.

The density of the pellet so-fired by the above test was about 3.01 grams per cubic centimeter.

A second powder sample was pre-calcined at 700° C. for 3 hours, then given the aforesaid Standard Laboratory Periclase Firing Test. The sample so-treated, i.e., precalcined and given the standard firing test, had a density of about 3.38 gm./cc.

A third sample was pre-calcined at 1000° C. for 3 hours, then given the aforesaid standard periclase test. The density of this sample (after the standard test) was about 3.44 gm./cc.

The theoretical density of magnesium oxide is about 3.581 gm./cc. (calcined basis).

These tests show that the magnesium carbonate prepared by the novel process of the present invention is highly useful as a calcinable feed to a periclase kiln in a method of producing a low impurity, high density, magnesium oxide product, especially a low boron product.

The present invention may be modified and changed without departing from the spirit or scope thereof, and it is understood that the present invention is only limited as defined in the appended claims.

We claim:

1. A method of treating magnesium hydroxide slurries to remove boron impurities comprising: carbonating a boron impurity-containing aqueous magnesium hydroxide slurry with a carbon dioxide-containing gas at a temperature of from about 10° to about 40° C.; precipitating solid magnesium carbonate hydrate in a liquid phase; separating said hydrate from said liquid phase and; washing the precipitate so-separated to purify same by removing soluble and/or occluded boron and other impurities therefrom.

2. A method for preparing magnesium oxide essentially free of boron and chloride impurities comprising: (a) providing a boron and chloride-containing aqueous magnesium hydroxide slurry, (b) carbonating said slurry with a carbon dioxide-containing gas at a temperature of from about 10° to about 40° C. thereby to precipitate solid hydrated magnesium carbonate in a liquid phase, (c) separating said hydrated magnesium carbonate precipitate from said liquid phase, (d) washing the precipitate so-separated to purify same by removing soluble and/or occluded boron and other impurities therefrom and (e) calcining said washed precipitate to drive off carbon dioxide gas and water from the hydrated magnesium carbonate, thereby to form magnesium oxide characterized by a low boron and chloride impurity level.

3. The method of claim 2 wherein the boron level in the magnesium oxide product does not exceed about 300 p.p.m.

4. The method of claim 2 wherein the temperature of step (b) ranges from about 25° to about 35° C., thereby to precipitate primarily magnesium carbonate trihydrate.

References Cited

UNITED STATES PATENTS 2,442,481 8/1944 Baker _____ 23—67
2,692,816 10/1954 Vettel _____ 23—201

OSCAR R. VERTIZ, Primary Examiner.

H. S. MILLER, Assistant Examiner.

U.S. Cl. X.R.

23—201